United States Patent
Saleh et al.

(10) Patent No.: US 12,181,296 B2
(45) Date of Patent: Dec. 31, 2024

(54) COST-BASED VEHICLE ROUTING

(71) Applicant: TOYOTA MOTOR NORTH AMERICA, INC., Plano, TX (US)

(72) Inventors: Aghyad Saleh, Grand Prairie, TX (US); Eduard Vandersmitte, McKinney, TX (US); Scott Meyer, Allen, TX (US); Jarrod Marini, Aubrey, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 109 days.

(21) Appl. No.: 16/555,822

(22) Filed: Aug. 29, 2019

(65) Prior Publication Data
US 2021/0063181 A1  Mar. 4, 2021

(51) Int. Cl.
*G01C 21/34* (2006.01)

(52) U.S. Cl.
CPC ..... *G01C 21/3469* (2013.01); *G01C 21/3446* (2013.01); *G01C 21/3492* (2013.01)

(58) Field of Classification Search
CPC ............ G01C 21/3453; G01C 21/3461; G01C 21/3469; G01C 21/3492
See application file for complete search history.

(56) References Cited

U.S. PATENT DOCUMENTS

| | | | |
|---|---|---|---|
| 2011/0238457 A1* | 9/2011 | Mason | G06Q 10/063112 705/7.14 |
| 2012/0022781 A1* | 1/2012 | Wilson | G01C 21/3469 701/410 |
| 2013/0261966 A1* | 10/2013 | Wang | G01C 21/3469 701/400 |
| 2014/0129139 A1* | 5/2014 | Ellison | G01C 21/3469 701/533 |
| 2016/0332623 A1* | 11/2016 | Baverstock | B60W 10/10 |
| 2017/0192437 A1* | 7/2017 | Bier | G05D 1/0278 |
| 2017/0276502 A1* | 9/2017 | Fischer | G01C 21/3614 |
| 2018/0094943 A1* | 4/2018 | Grochocki, Jr. | G01C 21/3492 |
| 2019/0107406 A1* | 4/2019 | Cox | G01S 19/42 |
| 2019/0316924 A1* | 10/2019 | Morgan-Brown | G01C 21/3697 |
| 2021/0055120 A1* | 2/2021 | Roth | G06Q 10/08355 |

FOREIGN PATENT DOCUMENTS

| | | |
|---|---|---|
| KR | 20090037196 | 4/2009 |
| WO | 9914701 | 3/1999 |

* cited by examiner

*Primary Examiner* — Khoi H Tran
*Assistant Examiner* — Tristan J Greiner
(74) *Attorney, Agent, or Firm* — SHEPPARD, MULLIN, RICHTER & HAMPTON LLP; Daniel N. Yannuzzi

(57) ABSTRACT

Systems and methods are provided for determining navigation routing of a vehicle based on predicted total cost of possible routes, including: receiving information identifying a destination for a vehicle; determining two or more possible routes from a origination to the destination; determining a plurality of cost factors for a plurality of the determined possible routes, wherein the cost factors comprise direct cost information for the plurality of determined possible routes and indirect cost information for the plurality of determined possible routes; calculating a total cost for each of the plurality of determined possible routes using the cost factors; and presenting to the user a lowest-total-cost route from among the plurality of determined possible routes.

28 Claims, 6 Drawing Sheets

COST-BASED VEHICLE ROUTING

TECHNICAL FIELD

The present disclosure relates generally to vehicle routing, and in particular, some implementations may relate to identifying a vehicle route based on a total cost prediction for that route.

DESCRIPTION OF RELATED ART

Computer assisted navigation and routing have become ubiquitous in modern society. Onboard vehicle navigation systems, such as GPS and other position determination systems, I have been, a popular option. Smart phone integration, allowing a vehicle to display smart-phone-based navigation instructions one of vehicle head unit has become another popular option. A number of apps are available for smart phones and other like devices to provide the navigation function.

With such systems, a user enters a destination and allows the system to calculate a desired route to the destination. The system may consider several routes and filter them based on factors such as total travel distance, total travel time, user preferences for types of route segments. Examples of types may include freeways, toll roads, ferries, and so on). The determined "best" route, which may be based on user preferences, can be presented to the user in the form of turn-by-turn instructions with corresponding images displayed on a map display.

Some applications consider the efficiency of certain routes as relating to the performance of electric vehicles (EVs) or hybrid electric vehicles (HEVs). EV's or HEVs may perform more efficiently on different routes. Terrain, traffic volumes, number of traffic lights and remaining vehicle range may be factors used to consider whether a particular route option is more preferred for the EV or HEV as compared to other routes.

BRIEF SUMMARY OF THE DISCLOSURE

According to various embodiments of the disclosed technology a method for determining navigation routing based on predicted total cost of possible routes may include: receiving information identifying a destination for a vehicle determining two or more possible routes from a origination to the destination determining a plurality of cost factors for a plurality of the determined possible routes, In some embodiments, the cost factors may include direct cost information for the plurality of determined possible routes and indirect cost information for the plurality of determined possible routes; calculating a total cost for each of the plurality of determined possible routes using the cost factors; and presenting to the user a lowest-total-cost route from among the plurality of determined possible routes. Determining a plurality of cost factors for the plurality of determined possible routes, may include: using the direct cost information to determine direct costs for segments of each of the plurality of determined possible routes correlating indirect cost information to the segments of each of the plurality of determined possible routes and using the correlated indirect cost information to assign indirect costs to the segments of each of the plurality of determined possible routes for each segment of a route, combining direct costs determined for that segment with indirect costs assigned to that segment to arrive at a total segment cost.

The method may also include, for a route with multiple segments, calculating a total cost for that route may include combining the total segment costs for each of the segments in that route.

The method may also include determining composite route scores each of the plurality of determined possible routes, In some embodiments, a composite route score for a route may include a combination of the calculated total cost for that route with other route parameters. In some embodiments, the composite route score for each route may include a weighted combination of cost information for each route and other route parameters for each route.

In some embodiments, cost factors for a plurality of the determined possible routes may include cost factors for one or more segments of the determined possible routes, and In some embodiments, determining a plurality of cost factors for the determined possible routes may include: determining the plurality of cost factors for the one or more segments in advance of determining possible routes from the origination to the destination; and retrieving the determined plurality of cost factors to use in calculating the total cost for each of the plurality of determined possible routes.

The method may also include amending a route of the determined possible routes based on a cost of segments of the determined possible routes.

In some embodiments, presenting to the user a lowest-total-cost route from among the plurality of determined possible routes may include displaying the total cost for each of a subset of the plurality of routes to a vehicle operator.

The method may also include selecting the lowest-total-coast route as a route to be used to navigate the vehicle from the origin to the destination.

In some embodiments, the cost factors for each route may include energy consumption costs for each route, vehicle maintenance costs for each route, and third-party expenses for each route. The third-party expenses for each route may include a cost of fuel at fueling stations along each route.

The method may also include receiving actual cost information from a plurality of vehicles over the plurality of routes to train a machine learning model to predict the indirect costs for the routes.

In further embodiments, a vehicle routing system may include: a processor; and a memory coupled to the processor to store instructions, which when executed by the processor, cause the processor to perform operations, the operations comprising: receiving information identifying a destination for a vehicle determining two or more possible routes from a origination to the destination determining a plurality of cost factors for a plurality of the determined possible routes, In some embodiments, the cost factors may include direct cost information for the plurality of determined possible routes and indirect cost information for the plurality of determined possible routes; calculating a total cost for each of the plurality of determined possible routes using the cost factors; and presenting to the user a lowest-total-cost route from among the plurality of determined possible routes. In some embodiments, determining a plurality of cost factors for the plurality of determined possible routes, may include: using the direct cost information to determine direct costs for segments of each of the plurality of determined possible routes correlating indirect cost information to the segments of each of the plurality of determined possible routes and using the correlated indirect cost information to assign indirect costs to the segments of each of the plurality of determined possible routes for each segment of a route, combining direct costs determined for that segment with indirect costs assigned to that segment to arrive at a total segment cost.

In some embodiments, the operations further may include, for a route with multiple segments, calculating a total cost for that route may include combining the total segment costs for each of the segments in that route.

In some embodiments, the operations further may include determining composite route scores each of the plurality of determined possible routes, In some embodiments, a composite route score for a route may include a combination of the calculated total cost for that route with other route parameters. The composite route score for each route may include a weighted combination of cost information for each route and other route parameters for each route.

In some embodiments, cost factors for a plurality of the determined possible routes may include cost factors for one or more segments of the determined possible routes, and In some embodiments, determining a plurality of cost factors for the determined possible routes may include: determining the plurality of cost factors for the one or more segments in advance of determining possible routes from the origination to the destination; and retrieving the determined plurality of cost factors to use in calculating the total cost for each of the plurality of determined possible routes.

In some embodiments, the operations further may include amending a route of the determined possible routes based on a cost of segments of the determined possible routes.

In some embodiments, presenting to the user a lowest-total-cost route from among the plurality of determined possible routes, may include displaying the total cost for each of a subset of the plurality of routes to a vehicle operator.

In some embodiments, the operations further may include selecting the lowest-total-coast route as a route to be used to navigate the vehicle from the origin to the destination.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
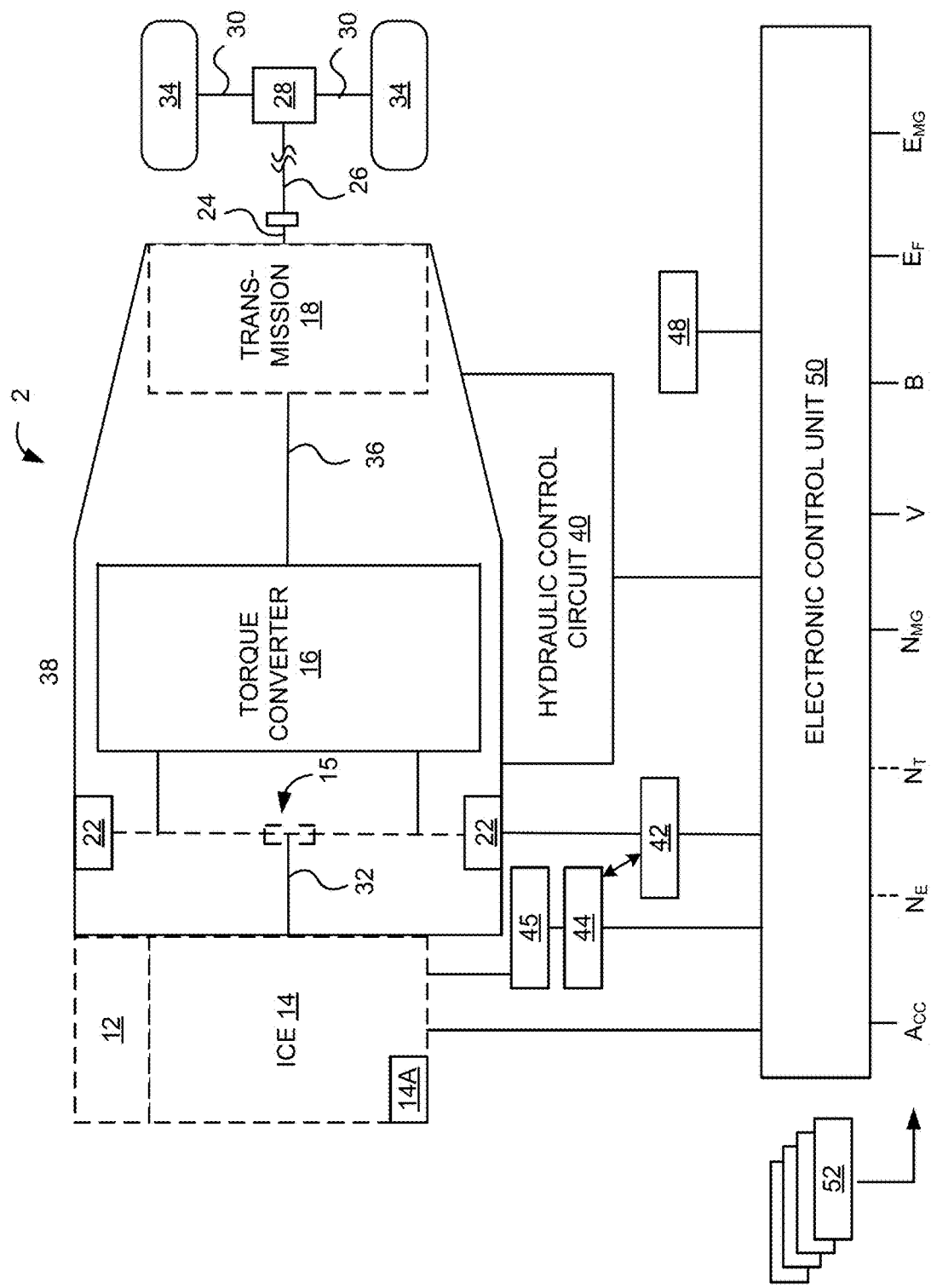
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

Embodiments of the systems and methods disclosed herein use data sourced from a number of contributors including, for example, other drivers and vehicles (e.g., crowd sourced, V2X, and so on), infrastructure elements, other applications and databases. This information can be used along with subject-vehicle data to determine the cost of route segments between a current location and a desired destination. The total cost for each segment can be computed and each segment evaluated to assemble the most cost-effective route for a trip from a current location to an identified destination. Cost factors for each segment can include, for example, energy consumption data for each segment (e.g., fuel economy information, fuel consumption projection, electricity consumption (for EVs), etc.), third-party cost-parameter data such as gas prices at local gas stations along route segments, weather information along route segments, traffic information along route segments, road construction information along route segments, road quality and terrain information along route segments, etc. These various cost factors can all contribute to the total segment cost for each segment. For example, rough or curvy roads can contribute to tire wear; stop-and-go traffic can contribute to brake wear; road construction might lead to tire or suspension wear or the need for a carwash; and so on. Algorithms can be implemented to compute the contribution of each cost parameter for various routes or for segments along various routes and account for the interrelated relationships among the factors.

As noted above, road segments can be scored based on the cost factors contributing to the cost of each segment (e.g., by adding the costs) to determine the most cost-effective segments. In some applications, the cost factors for the various road segments can be predicted based on segment characteristics. For example, uphill segments can be predicted to result in lower fuel economy than flatter segments. Cost factors for various road segments can also be tallied based on actual data. In some embodiments, a combination of predicted and actual costs can be used to form a total cost segment.

Actual cost data can be measured across multiple trips taken by different vehicles allowing scoring to be performed quantitatively based on actual trip data. For example, in a crowd-sourced embodiment the system may be configured to track the trips of multiple vehicles of known vehicle type traveling along a road segment or segments. The segments can be classified according to their physical characteristics. These characteristics might include, for example, road inclination or elevation change, road surface quality or roughness, speed limit, existence of tolls, presence of stoplights, particular terrain, and so on). These characteristics can be used to classify various segments into classes, and cost factor data collected from multiple vehicles across segments can be applied to other segments of a similar classification. In addition to physical characteristics, situational characteristics can also be considered, including seasonal or temporary conditions. These might include, for example, weather conditions, road construction, traffic, fuel consumption, changes in tire pressure, and so on. These situational characteristics can also be used to classified segments or to alter a segment classification based on the current situation. For example, a segment that might be in one classification during the spring and summer months, might be in a different classification during fall and yet another classification during winter.

Using such a technique, similar segments are categorized into similar classes, and the classes can be scored based on measured cost of travel across a plurality of vehicles. The actual dollars spent on fuel, toll fees, wasted time due to traffic congestion, the cost of traveling in inclement weather, etc. can be tracked on a per class basis and mapped to other segments of like classification. This information can be used to create a dynamic per-class, road-to-cost index that can be used to create rules to score new segments based on their classification. This information can be used to reach final predicted total scores for different routes of a trip a driver is about to undertake. Furthermore, driver performance and score measurements can also be incorporated into the cost predictions to measure any dynamic elements that might affect the course of the trips like gas consumption based on personal driving habits, driving speed, and other driver-focused items.

Each of the plurality of routes may be made up of one or more route segments. Data can be fed into a routing application to provide cost information for each of the plurality of routes. The cost information can be displayed to a vehicle operator so that the route determination can be made. Additional information can be provided along with the cost information such as, for example, time of travel for each route, type of route (e.g., city, highway, etc.) or other factors that might be of interest to an operator selecting route. Or, the system may make the determination automatically based on cost or based on a weighted combination of factors entered by an operator or system designer.

Actual cost data, such as fuel consumption, fuel costs (per-unit or aggregate), repair costs, and so on can be fed back to allow AI/ML to train and refine the models used to predict the costs for the various segments.

The system may also consider the type of vehicle or other vehicle characteristics when performing calculations. For example, HEVs are generally more efficient in town then on the highway. Similarly, different vehicles may have different spreads between city and highway fuel economies. As another example, vehicle sensor data used to calculate instantaneous and average fuel economies for the vehicle can be used to provide vehicle-specific fuel economy information as a whole or for specific route segments, and this information may be used as an input to the cost calculation algorithm. Accordingly, the fuel economy of a particular vehicle group or of a specific vehicle can be taken into account when evaluating cost differentials among a plurality of routes. A vehicle group might be defined, for example, by one or more of the following: make/model/trim, vehicle options (e.g., engine size, transmission, accessories, and so on), by vehicle class or weight, by vehicle type (e.g., compact, midsize, SUV, light-duty truck, HEV, EV, and so on). In some embodiments, fuel economy information can be tracked on a per driver basis as well, recognizing that different drivers may achieve different fuel economy results with the same vehicle.

Other factors that affect vehicle fuel economy may also be considered when calculating fuel consumption as part of the route cost. These factors might include, for example, whether the vehicle is towing a trailer, vehicle tire pressure (e.g., as measured by vehicle TPMS), whether the vehicle is operating with a convertible top down or windows open, whether the vehicle air-conditioning is on, and so on.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) with which embodiments of the disclosed technology may be us is illustrated in FIG. 1. Although the example described with reference to FIG. 1 is a hybrid type of vehicle, the systems and methods for cost-based routing determination can be implemented in other types of vehicle including gasoline- or diesel-powered vehicles, fuel-cell vehicles, electric vehicles, or other vehicles.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

In various embodiments, a cost-based routing system can be provided to perform cost predictions and route recommendations in accordance with predicted cost as at least one factor. The system can be self-contained within the vehicle (e.g., as part of the vehicle navigation system) or app on a smart phone or other mobile device, and make the cost-based routing determinations based on data stored at the vehicle or data received in real time from other vehicles or other sources. In other implementations, the system can be a server-based system (e.g., a cloud system) or an edge computing platform that performs cost-based routing determinations in whole or in part external to the vehicle and provides cost predictions or route determinations to the vehicle. In yet further implementations, the system can be a distributed computing system performing the processing functions across multiple entities.

Figure 2:
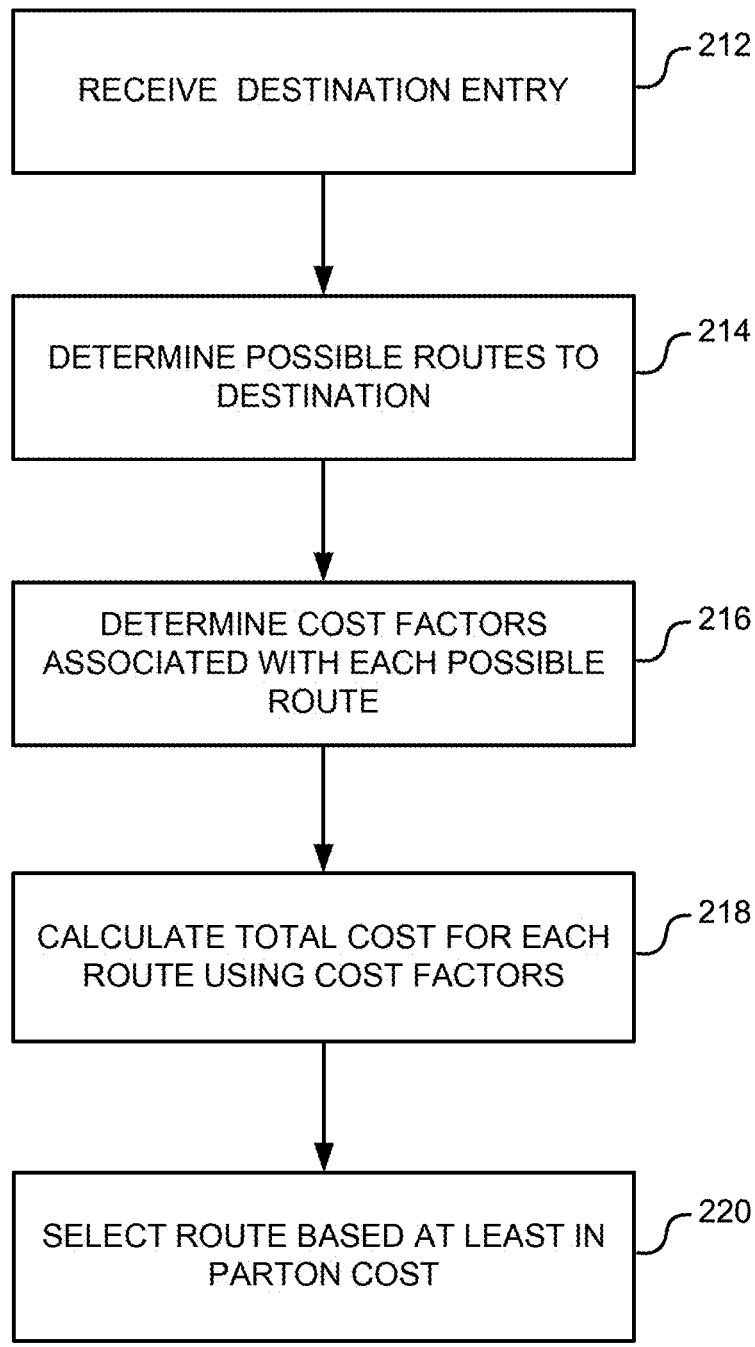
FIG. 2 illustrates an example process for cost-based route determinations in accordance with one embodiment.

FIG. 2 illustrates an example process for cost-based routing determinations in accordance with one embodiment. With reference now to FIG. 2, at operation 212, a cost-based routing system receives a destination entry. For example, the user may enter a destination at the vehicle head unit or any mobile app and indicated the user would like the navigation system to direct the user to that location. At operation 214, the system determines multiple possible routes to the destination given the vehicle's current location. In some embodiments, the vehicle navigation system or mobile application can provide different route options to a cost-based routing system. In other embodiments, the cost-based routing system computes the route options directly.

With multiple different routes presented, the cost-based routing system determines cost factors associated with a plurality of the possible computed routes. This is illustrated at operation 216. At this operation, the system may review cost data such as, for example, known fuel prices along the route, traffic information, whether information, road construction information, or other information that may contribute to the cost of operating a vehicle along a designated route.

At operation 218, the system uses these cost parameters to calculate total cost for each route. Then, at operation 220, the system can either select the most cost-effective route, select a route based on cost-effectiveness and other user selections (e.g., weighing the trade-off between cost-effectiveness and time of travel) or present a plurality of routes to the user cost information, or with cost information and other information, so the user can make an informed selection. In some embodiments, the system may be configured to provide alternative route selections to the operator with names or by category. The system might present a plurality of different routes identified as, for example, the eco-friendly route (e.g. the route that results in consumption of the least amount of energy or is the most environmentally friendly), the most cost-effective route, the fastest route, the shortest route, and so on. Accordingly, a final route can be selected solely based on cost, or based on cost in combination with other factors.

The foregoing example assumes that a number of route options are selected in advance, these route options are costed to predict route costs and their relative costs compared to select the desired route. These options can be presented to the operator and the operator can toggle or select options based on his or her preferences. These options might include avoiding toll roads, maximizing the use of highways, selecting the shortest route, selecting the quickest route, and so on. In other embodiments, a number of route segments between a current position and the designated destination can be considered from a cost basis, and the segments assembled to achieve the lowest cost solution, or to achieve a solution with cost and other factors considered. Accordingly, segments can be costed in advance or in real time and assembled to form a route on the basis of cost. In yet further implementations, the system may amend the route options by suggesting on the basis of cost routes different from those presented to the cost-based route determination system. Embodiments may also be implemented to provide a carbon offset option that allows the operator to select a carbon offset contribution for the route. The carbon offset amount might be based on the actual calculated energy consumption for the vehicle, a fixed amount selected by the driver, or other amount calculated using other criteria.

Figure 3:
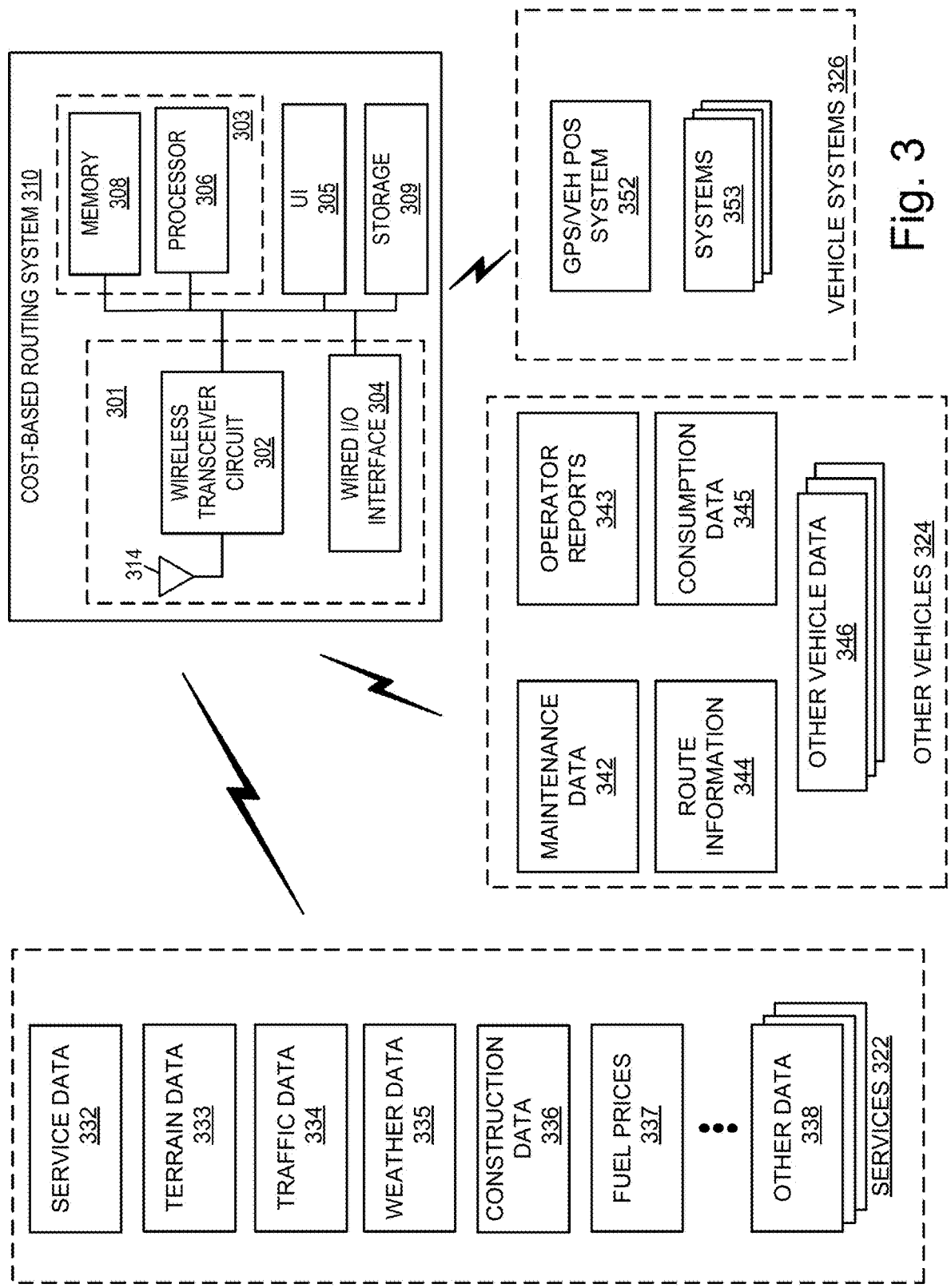
FIG. 3 is a diagram illustrating an example of a cost-based route determination system and various example data sources in accordance with one embodiment.

FIG. 3 is a diagram illustrating an example of a cost-based routing determination system and various example data sources in accordance with one embodiment. In this example, a cost-based routing system 310 is a processor-based system that includes a communication circuit 201, a decision circuit 303 (including a processor 306 and memory 308 in this example) a user interface 305 and data storage 309. Components of cost-based routing system 310 are illustrated as communicating with each other via a data bus, although other communication in interfaces can be included.

Processor 306 can include one or more GPUs, CPUs, microprocessors, or any other suitable processing system. Processor 306 may include a single core or multicore processors. The memory 308 may include one or more various forms of memory or data storage (e.g., flash, RAM, etc.) that may be used to store cost parameters, instructions and variables for processor 306 as well as any other suitable information. Memory 308, can be made up of one or more modules of one or more different types of memory, and may be configured to store data and other information as well as operational instructions that may be used by the processor 306 to cost-based routing system 310.

Communication circuit 301 may include either or both a wireless transceiver circuit 303 with an associated antenna 314 and a wired I/O interface 304 with an associated hardwired data port (not illustrated). As this example illustrates, communications with cost-based routing system 310 can include either or both wired and wireless communications circuits 301. Wireless transceiver circuit 302 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 314 is coupled to wireless transceiver circuit 302 and is used by wireless transceiver circuit 303 to transmit radio signals wirelessly to wireless equipment with which it is connected and to receive radio signals as well. These RF signals can include information of almost any sort that is sent or received by cost-based routing system 310 to/from other entities such as sensors 153 and vehicle systems 158.

Wired I/O interface 304 can include a transmitter and a receiver (not shown) for hardwired communications with other devices. For example, wired I/O interface 304 can provide a hardwired interface to other components, including sensors 153 and vehicle systems 158. Wired I/O interface 304 can communicate with other devices using Ethernet or any of a number of other wired communication protocols whether standardized, proprietary, open, point-to-point, networked or otherwise.

User interface 305 can include a user interface suitable to allow an operator to access the system. For example, or on-board applications, the user interface 305 may include a touchscreen display and one or more associated buttons on a vehicle head unit or navigation system. For server-based applications of cost-based routing system 310, user interface may include a keyboard, mouse and display screen allowing a user to access the server-based system. In embodiments where functionality of the cost-based routing system or distributed amongst one or more vehicles and a server-based system, a combination of the foregoing user interfaces or multiple different user interfaces may be provided.

Cost-based routing system 310 may also include data storage 309 such as, for example, a hard disk drive, solid-state drive, flash memory, or other storage unit that can store information such as cost parameters or other data used by the system when making cost predictions.

In this example, cost-based routing system 310 can receive information from a number of different sources for you soon predicting costs of routes and the one or more route segments that make up the routes. This example shows data coming from three possible sources: services 322, other vehicles 324, and vehicle systems 326 for the subject vehicle for which the route is being created.

Services 322 may include any of a number of different third-party or other external services. The illustrated example data services include includes vehicle service history data 332, route terrain data 333, traffic data 334, whether data 335, construction data 336, fuel prices 337 and other data sources 338. Vehicle service history data 332 may be used, to gather actual vehicle service records for vehicles that regularly traversed particular route segments. This information might show, for example, that vehicles that frequently traveled certain route segments as higher service costs (e.g., in general, or for specific items) as compared to vehicles that travel other route segments. Accordingly, this data service can provide costs for maintenance items for vehicles attributed to route segments. Maintenance items may include, for example, routine scheduled maintenance items such as oil changes, brake fluid changes, tire rotations, and so on. Maintenance items may also include repairs to the vehicle beyond the scheduled maintenance items. The maintenance information may, and some embodiments, be sorted by vehicle make, model, trim, class or type such that different maintenance-cost information for route segments may be determined for different vehicle categories.

Terrain data 333 can also be gathered for various route segments. This information be provided, for example, by state or local agencies or other authorities that monitor and report on road conditions or other terrain information. This might include the relevant Department of Transportation, local sheriff or police organizations, road consulting or other groups, and so on. This information might also be crowd sourced such as by community groups who monitor road conditions or by actual users who may be prompted to enter road conditions as they travel along various route segments. Terrain data 333 might indicate the level of wear and tear that might be faced by a vehicle traveling along various route segments. For example, rough terrain, the presence of potholes or other bad road conditions could lead to increased wear on shocks, struts, and other suspension components, more frequent tire damage or other vehicle wear and tear. As another example, hilly terrain might lead to increased fuel consumption during ascents and increased brake wear during descents.

Traffic data 334 can also be evaluated for various route segments to determine cost factors such as fuel consumption and brake wear. Traffic data can be obtained from a number of different traffic data sources, including government and private sources as well as crowd sourced data. Event information such as sporting events, conventions, parades and other activities may also impact traffic for various route segments.

Weather data 335 can also be evaluated for different route segments. In some cases, generally for longer trips, different routes may experience different weather conditions. Accordingly, weather data can be received from weather services or crowd sourced data services and used to predict route segment costs. For example, where snow is expected, salt used to melt snow on the roads can cause vehicle corrosion and be a longer-term cost factor. Snow might also require the user to purchase and apply tire chains or snow tires to the vehicle. Colder climates may also affect fuel consumption or battery life adversely. Strong headwinds can also have an adverse effect on energy consumption. Accordingly, wind conditions (e.g., such as strong headwinds expected on a route segment through a mountain pass) can be used to calculate energy consumption costs.

Construction data 336 may also be received and evaluated to determine cost parameters for various route segments. Construction may cause more stop and go traffic; dirt from the construction site may require may require a vehicle washing; construction zones may lead to a higher incidence of vehicle repair such as, for example, tire damage from construction debris.

Fuel price information 337 may also be used to compute route costs. For example, actual current gasoline prices, diesel prices, electricity prices, hydrogen prices, or other prices for fuel can directly affect the cost of a route segment. The system can determine whether vehicle refueling may be required along the way, and may also predict which segment of a route fueling might be required. The system can receive fuel level data from the vehicle as well as predicted MPG information and use this data to predict a refueling stop. For longer trips where multiple stops may be required, vehicle range may be considered in making the determination.

As these examples illustrate, these and other data sources 338 may be used to provide information relating to the cost of route segments that can be used in predicting the total cost of various routes. As the examples above illustrate, services data 322 can be provided by commercial data services, public interest or government data services, individual user input, or crowd sourced data sources. Other cost information might include food prices along route segments (e.g., only expensive restaurants are available along a route segment or restaurant prices in general are higher along a route segment).

Information from other vehicles 324 can include information such as, for example, maintenance data 342, consumption data 345, route information 344, operator reports 343 and other vehicle data 346. Vehicle data from other vehicles 324 can be correlated to route segments so that data can be tracked by route segments. Maintenance data 342 may include vehicle maintenance information for each particular vehicle such as, for example, data on scheduled maintenance and repairs. This might include a log of replacement parts and repairs made to the vehicle and their associated costs. Repair and part replacement information might be tracked by date as well to help correlate this information with particular routes or route segments.

Route information 344 can include information regarding various routes traveled by an operator. For example, the vehicle may maintain a log of routes traveled to track street or other road segment usage. Routes traveled, or roads traveled on, can be determined and saved in a file along with the dates and times at which various route segments were traveled. This can aid in correlating other vehicle information with particular routes that were taken and with the dates and times at which particular routes were taken.

Operator reports 343 can include information entered by a vehicle operator or its passengers relevant to vehicle routes and costs associated there with. This can be in the form of spontaneous data entries about the routes or it may be in response to queries from a vehicle system. For example, while traveling a particular route or at the end of a route the system may query the user to enter information about the quality of the route, the costs of meals, fuel, or other incidentals along the way, or other information that may be related to the cost of traveling a particular route or route segment.

The vehicle may also track and gather consumption data 345 such as instantaneous fuel consumption data, average fuel consumption data, or other relevant consumption information. This information can be logged along with corresponding location information such that fuel consumption for particular route segments can be determined. The system can also track this information based on date and time so that seasonal variations in consumption along different route segments can be accounted for and considered in cost-based route determinations.

Other vehicle data 346 can include a number of other parameters that may affect the cost of operating the vehicle and may be relevant in cost-based route determinations. For example, the system may track brake application, wheel travel, roll pitch and yaw of the vehicle, wheel spin, or other information that may indicate cost events. As with other forms of information, this information can be tracked in accordance with location date and time information such that the events can be correlated to particular route segments and seasonal or diurnal affects can be accounted for. High concentrations of brake application for particular segments may indicate that those segments will have a higher maintenance cost for brakes. Strength of brake application, duration of application, speed of the vehicle during application temperature of the brakes and other information can be obtained and used to predict the amount of brake wear incurred during a particular segment. Wheel travel may indicate a bumpy road, which can cause excess where of shocks and struts or other suspension components, require more frequent alignments, possibly damage tires, and so on. Vehicle roll, pitch and yaw may indicate bumpy roads, which could also contribute to increased wear and tear on the vehicle. As these examples illustrate, sensor data gathered from the vehicle can be used to detect vehicle operating conditions and make a more effective prediction of the cost of route segments. Although not illustrated, other vehicles 324 may also include a position determination system, such as a GPS system, so that the information collected by vehicle sensors and other systems can be correlated to vehicle position information.

Vehicle systems 326 for the subject vehicle include a GPS or other vehicle positioning system 352 that can be used to allow the user to enter a desired destination and to present the selected route or the route options to the user. Systems 353 can include sensors and other systems used by the vehicle to capture operational data. Systems 353 for the subject vehicle can include, for example, some or all of the various sensors and systems included with one or more of the other vehicles 324. Accordingly, subject vehicle 326 can also be used as a source of data for route cost predictions. Similarly, other vehicles 324 may also include or interface with a cost-based route determination system.

Figure 4:
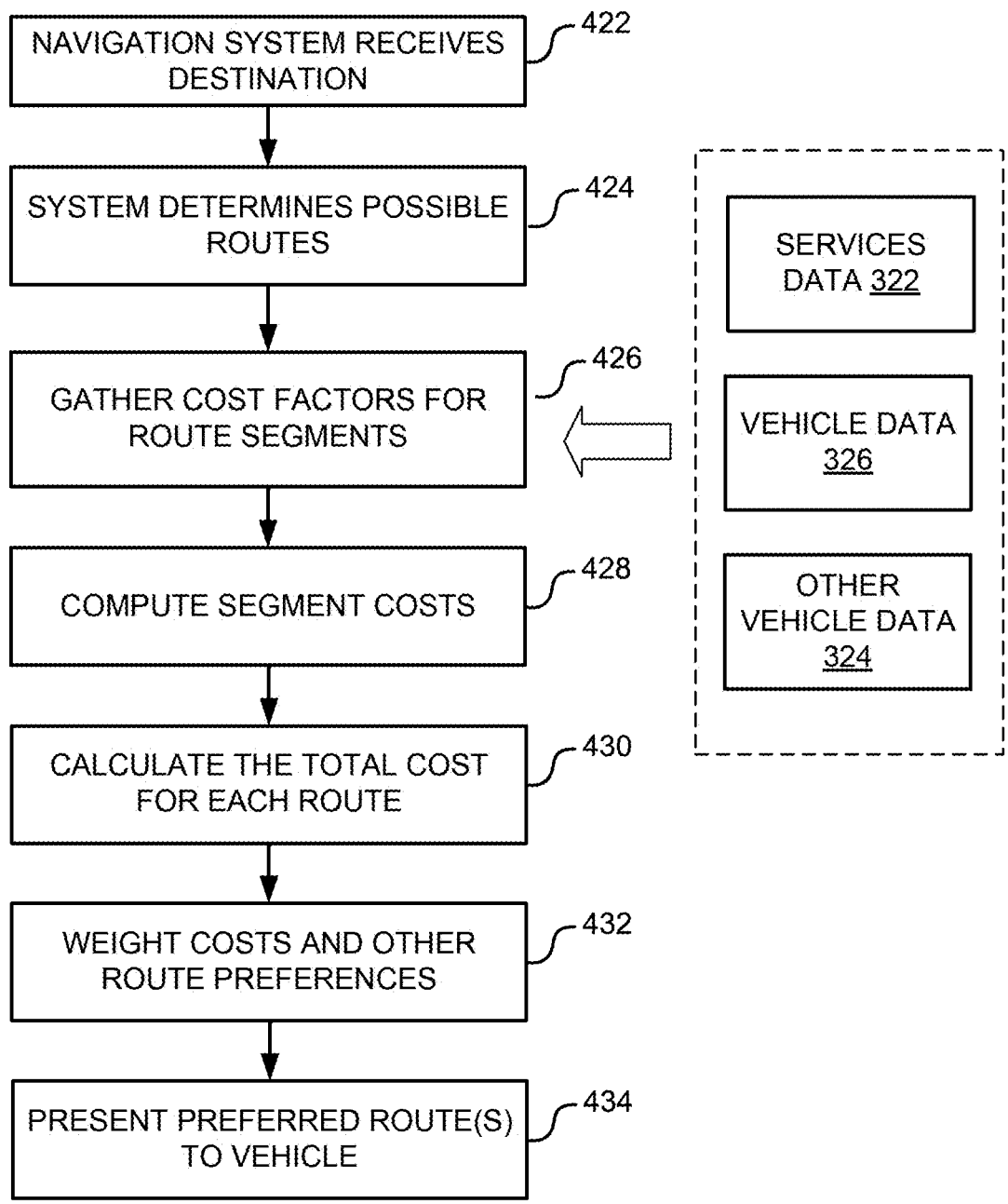
FIG. 4 illustrates an example process for cost-based route determination in accordance with one embodiment.

FIG. 4 illustrates an example process for cost-based route determination in accordance with one embodiment. With reference now to FIG. 4, at operation 422 a navigation system receives a desired destination. For example, a user may enter an intended destination into a mobile app or vehicle navigation system. In operation 424, the system determines possible routes from a current location to the entered destination. This can be performed by the navigation system into which the destination was entered. Alternatively, the destination can be provided to a cost-based route determination system separate from the navigation system (in some embodiments, cost-based route determination can be included in the navigation system) so that the cost-based route determination system may determine possible routes.

At operation 426, the cost-based route determination system receives cost factors for route segments. As illustrated in the example of FIG. 3, this might include services data 322, other vehicle data 324 and subject vehicle data 326. The cost-based route determination system can use this information in operation 428 to compute the costs associated with various route segments. At operation 430, the system can use the segment cost to compute the total cost for each route.

At operation 432, the system can combine the route costs with other route parameters such as time, distance, road attributes (e.g., tolls, highway, unpaved, and so on) and other information to determine composite route scores. For example, a composite route score can be a weighted combination of cost information and other route parameters resulting in a composite score. In some embodiments, user preferences may be utilized to determine weighting of the various parameters. In other embodiments, the weighting can be predetermined. Where cost parameters are weighted at 100% and the other parameters are weighted zero, the routing determination can be made solely on cost. In a similar manner, user preferences can be used to override particular routes regardless of the other parameter values. For example, the user may have set user preferences that result in the system rejecting a route that includes tolls regardless of the fact that that route may be cheaper overall for other reasons. As another example, the user may have set user preferences that indicate that cost-based routing is the only parameter, and therefore the system can the most cost-effective route.

In operation 434, the system presents the preferred routes to the user. The system may present a single chosen route, and the route may have been selected based on a weighted combination of route parameters. In another embodiment, the system may present a plurality of route options to the user so that the user can select the most appropriate route. For example, the user may be given a listing of routes ranked by cost, the user may be given a listing of routes ranked by score (e.g., a weighted combination of parameters) or the user may be given a listing of routes and the associated parameters for each route.

In various embodiments, segment costs or route costs can be computed in advance and stored on the system such that cost and have to be computed each time a routing request is received from a user. Where route costs are created in advance (e.g., for popular source/destination pairs) the system can quickly retrieve the costs and present cost information to the user with the routes or present the most cost-effective route to the user.

In other embodiments, costs can be computed in real time as routing requests are received. When a request is received, information for the various route segments can be gathered (e.g., gathered from their sources, or if gathered in advance retrieved from storage) and route costs calculated. In yet further embodiments, a hybrid approach can be taken in which route costs are computed in advance and updated in real time to accommodate changed information.

Figure 5:
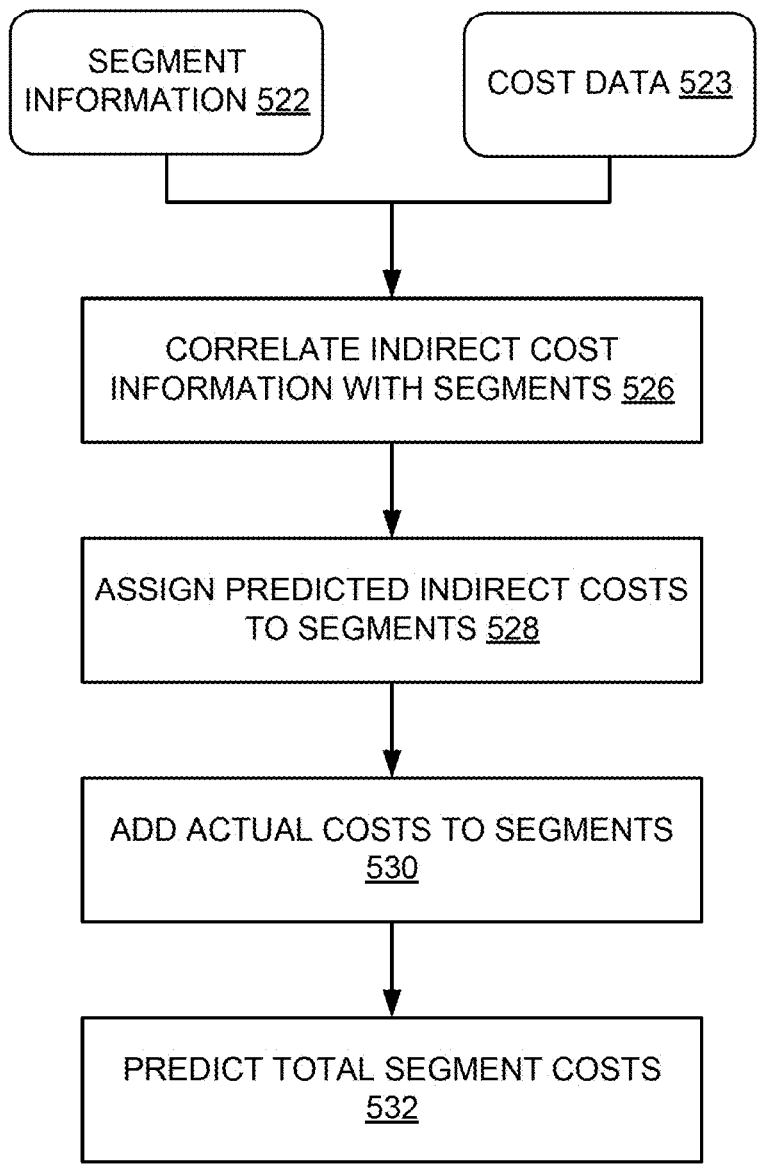
FIG. 5 illustrates an example process for predicting costs associated with routes and route segments in accordance with one embodiment.

FIG. 5 illustrates an example process for predicting costs associated with routes in accordance with one embodiment. In the example illustrated in FIG. 5, the system collects segment information 522 and cost data 523 from various data sources.

Cost data 523 can include data from services 322, the subject vehicle 326 and other vehicles 324. This can include, for example, the information described above with reference to FIG. 3. Cost data can provide actual cost information (e.g., fuel prices along route segments, tolls along route segments, meal prices along route segments, and so on) and attributable cost information (e.g., the costs of repairs and other maintenance attributable to the road segments).

The various data sources can also include road segment information 522. From a services 322 perspective, for example, fuel prices, meal prices, tolls, construction data, traffic data and other data pieces all be tied to particular route segments. Similarly, from the vehicles' perspectives, operator reports, consumption data, and other "real-time" data can be tied to route segments.

Other information that has a longer time horizon might not be directly attributable to a particular segment. For example, maintenance cost information over a 10,000 mile period might not necessarily be capable of being tied with a one-to-one correspondence to a particular road segment. The vehicle may have been operated over numerous (tens, hundreds or thousands) of road segments in that 10,000 mile interval. Accordingly at operation 526, for indirect cost data that is not directly attributable to a segment, the system can be configured to correlate this indirect cost information with the various segments.

This correlation may be performed in a number of different ways. For example, where a vehicle operates primarily on particular segments or has a higher concentration of segment classes (e.g., rough terrain versus smooth terrain, construction zones, dusty areas, and so on) cost information might be proportionally attributed to particular segments. Also, cost information for vehicles traveling primarily on one segment class (or a group of segment class) can be compared to cost information for vehicles traveling primarily on another segment class (or a different group of segment classes). This comparison can be used to determine whether certain segment classes have a higher cost than other segment classes. Data can be normalized for different vehicle types (e.g., make, model, trim, body type, class, and so on) so that more direct comparisons can be made across different vehicles. Where certain segment classes are ascertained to have a high cost factor or a low cost factor, this can be taken into account when attributing actual service costs incurred by a vehicle to the various segments over which that vehicle traveled during the corresponding service interval.

At operation 528, the predicted indirect costs for the segments as determined by the correlation can be assigned to their corresponding segments. At operation 530, the actual costs for the segments (e.g., those costs that are directly attributable to various segments) are added to the segment cost. Accordingly, computed segments can include an actual segment cost for the directly attributable costs and a predicted segment cost for the indirect costs to arrive at a total predicted segment cost. This is illustrated in operation 532. In some embodiments, indirect costs may be weighted differently from direct costs to account for the possibility or reality that the indirect costs are not applicable to the segments with as much certainty as direct costs.

Although not expressly discussed above, distance can also be used as a factor to attribute the cost of routes. For example, the life of the tires can be predicted (e.g., based on tread wear specifications), fuel costs can be based on distance (e.g., in addition to other particular factors associated with the route) and other maintenance costs can also be amortized across the total distance for each segment. These costs can be included in the predicted total segment costs.

Figure 6:
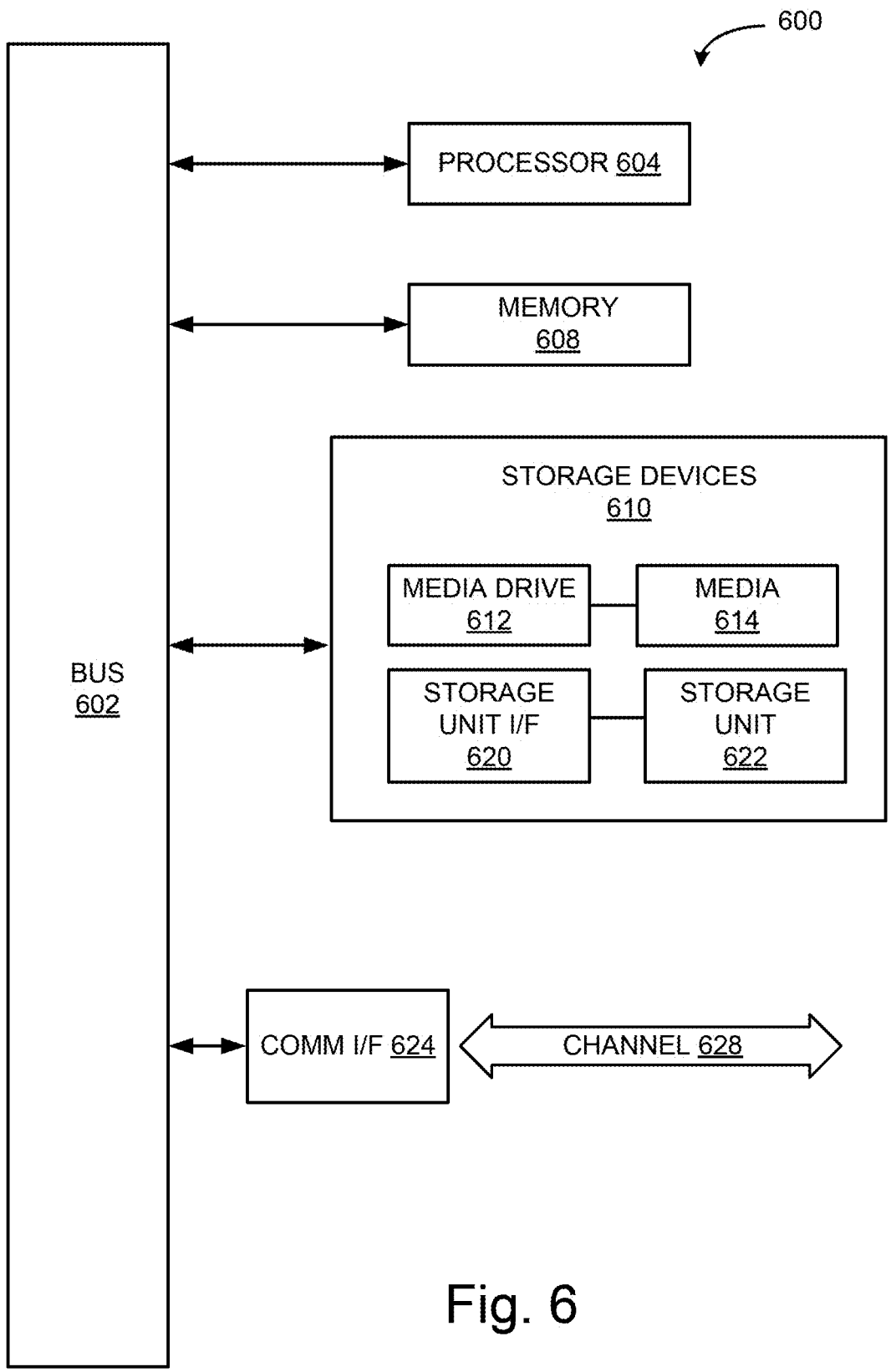
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for determining navigation routing based on predicted total cost of possible routes, comprising:
   receiving, by a vehicle, information identifying a destination for a vehicle;
   determining, by the vehicle, a plurality of possible routes from an origin to the destination;
   receiving, by the vehicle, vehicle data in real-time from a plurality of communicatively connected vehicles, wherein the vehicle data comprises consumption of energy along the plurality of possible routes for each of the plurality of communicatively connected vehicles and remaining battery life along the plurality of possible routes for each of the plurality of communicatively connected vehicles;
   determining, by the vehicle, a plurality of cost factors for the determined plurality of possible routes, wherein the cost factors comprise direct cost information for the determined plurality of possible routes and indirect cost information for the determined plurality of possible routes, the direct cost information comprising, for each of the determined plurality of possible routes, additional factors associated with energy consumption for a type of electric vehicle, the additional factors comprising the vehicle data from the plurality of communicatively connected vehicles, information used by a battery management system, including consumption of energy based on situational information and remaining battery life based on situational information tracked on a per-driver basis;
   correlating, by the vehicle, the indirect cost information to each of the determined plurality of possible routes such that each of the determined plurality of possible routes corresponds to a different indirect cost;
   calculating, for each of the determined plurality of possible routes, in real-time by the vehicle, a total cost as a combination of the direct costs and the indirect costs, wherein the calculating is performed in real-time during operation of the vehicle to the destination; and
   presenting to a user, by the vehicle, a determined lowest-total-cost route from among the determined plurality of possible routes, a determined lowest energy route from among determined plurality of possible routes, and composite route scores based on per-driver preferences for each of the determined plurality of possible routes.

2. The method of claim 1, wherein determining a plurality of cost factors for the determined plurality of possible routes, comprises:
   using the direct cost information to determine direct costs for segments of each of the determined plurality of possible routes;
   correlating indirect cost information to the segments of each of the determined plurality of possible routes and using the correlated indirect cost information to assign indirect costs to the segments of each of the determined plurality of possible routes; and
   for each segment of a route, combining direct costs determined for that segment with indirect costs assigned to that segment to arrive at a total segment cost.

3. The method of claim 2, further comprising, for a route with multiple segments, calculating a total cost for that route comprises combining the total segment costs for each of the segments in that route.

4. The method of claim 1, further comprising determining the composite route scores for each of the determined plurality of possible routes, wherein a composite route score for a route comprises a combination of the calculated total cost for that route with other route parameters.

5. The method of claim 1, wherein cost for the determined plurality of possible routes comprise cost factors for one or more segments of the determined plurality of possible routes, and wherein determining a plurality of cost factors for the determined plurality of possible routes comprises:
   determining the plurality of cost factors for the one or more segments in advance of determining possible routes from the origin to the destination; and
   retrieving the determined plurality of cost factors to use in calculating the total cost for each of the determined plurality of possible routes.

6. The method of claim 1, further comprising amending a route of the determined plurality of possible routes based on a cost of segments of the determined plurality of possible routes.

7. The method of claim 1, wherein presenting to the user a lowest-total-cost route from among the determined plurality of possible routes, comprises displaying the total cost for each of a subset of the determined plurality of possible routes to a vehicle operator.

8. The method of claim 1, further comprising selecting the lowest-total cost route as a route to be used to navigate the vehicle from the origin to the destination.

9. The method of claim 1, wherein the cost factors for each of the plurality of possible routes comprise vehicle maintenance costs for each route, and third-party expenses for each route.

10. The method of claim 9, wherein third-party expenses for each route comprise a cost of fuel at fueling stations along each route.

11. The method of claim 1, further comprising receiving the actual cost information from a plurality of vehicles over the determined plurality of possible routes to train a machine learning model.

12. A vehicle routing system, comprising:
   a vehicle;
   a processor of the vehicle; and
   a memory coupled to the processor to store instructions, which when executed by the processor, cause the processor of the vehicle to perform operations, the operations comprising
      receiving information identifying a destination for the vehicle;
      determining a plurality of possible routes from an origin to the destination;
      receiving vehicle data in real-time from a plurality of communicatively connected vehicles, wherein the vehicle data comprises consumption of energy along the plurality of possible routes for each of the plurality of communicatively connected vehicles and remaining battery life along the plurality of possible routes for each of the plurality of communicatively connected vehicles;
      determining a plurality of cost factors for the determined plurality of possible routes, wherein the cost factors comprise direct cost information for the determined plurality of possible routes and indirect cost information for the determined plurality of possible routes, the direct cost information comprising, for each of the determined plurality of possible routes, additional factors associated with energy consumption for a type of electric vehicle, the additional factors comprising the vehicle data from the plurality of communicatively connected vehicles, information used by a battery management system, including energy based on situational information and remaining consumption of battery life based on situational information-tracked on a per-driver basis;

correlating the indirect cost information to each of the determined plurality of possible routes such that each of the determined plurality of possible routes corresponds to a different indirect cost factor;

calculating a total cost for each of the determined plurality of possible routes in real-time as a combination of direct costs for each of the plurality of possible routes and indirect costs for each of the plurality of possible routes, wherein the calculating is performed in real-time during operation of the vehicle to the destination; and presenting to a user a determined lowest-total-cost route from among the determined plurality of possible routes, a determined lowest energy route from among the determined plurality of possible routes, and composite route scores based on per-driver preferences for each of the determined plurality of possible routes.

13. The vehicle routing system of claim 12, wherein determining a plurality of cost factors for the determined plurality of possible routes, comprises:

using the direct cost information to determine direct costs for segments of each of the determined plurality of possible routes;

correlating indirect cost information to the segments of each of the plurality of determined possible routes and using the correlated indirect cost information to assign indirect costs to the segments of each of the determined plurality of possible routes; and for each segment of a route, combining direct costs determined for that segment with indirect costs assigned to that segment to arrive at a total segment cost.

14. The vehicle routing system of claim 13, wherein the operations further comprise, for a route with multiple segments, calculating a total cost for that route comprises combining the total segment costs for each of the segments in that route.

15. The vehicle routing system of claim 12, wherein the operations further comprise determining the composite route scores for each of the determined plurality of possible routes, wherein a composite route score for a route comprises a combination of the calculated total cost for that route with the per-driver preferences, the per-driver preferences comprising at least one of: time, distance, and road attributes.

16. The vehicle routing system of claim 15, wherein the composite route score for each route comprises a weighted combination of cost information for each route and the per-driver preferences.

17. The vehicle routing system of claim 12, wherein cost factors for the determined plurality of possible routes comprise cost factors for one or more segments of the determined plurality of possible routes, and wherein determining a plurality of cost factors for the determined plurality of possible routes comprises:

determining the plurality of cost factors for the one or more segments in advance of determining possible routes from the origin to the destination; and retrieving the determined plurality of cost factors to use in calculating the total cost for each of the determined plurality of possible routes.

18. The vehicle routing system of claim 12, wherein the operations further comprise amending a route of the determined possible routes based on a cost of segments of the determined plurality of possible routes.

19. The vehicle routing system of claim 12, wherein presenting to the user a lowest-total-cost route from among the determined plurality of possible routes, comprises displaying the total cost for each of a subset of the plurality of routes to a vehicle operator.

20. The vehicle routing system of claim 12, wherein the operations further comprise selecting the lowest-total cost route as a route to be used to navigate the vehicle from the origin to the destination.

21. The vehicle routing system of claim 12, wherein the vehicle comprises a hybrid vehicle.

22. The method of claim 1, wherein the information sensed by one or more vehicle systems and tracked on a per-driver basis comprise at least one of: sensed towing of a trailer, sensed vehicle tire pressure, sensed convertible operation, sensed window operation, sensed air-conditioning operation, a carbon offset based on an actual calculated energy consumption for the vehicle, and electricity consumption.

23. The method of claim 1, wherein energy consumption tracked on a per-driver basis comprises at least one of: per-driver driver performance, gas consumption based on per-driver driving habits, and per-driver driving speed.

24. The method of claim 1, wherein the composite route score for a route comprises a weighted combination of cost factors for the route and the per-driver preferences, the per-driver preferences comprising at least one of: time, distance, and road attributes.

25. The method of claim 1, wherein the situational information comprises at least one of: gas prices along the determined plurality of possible routes, weather information along the determined plurality of possible routes, traffic information along the determined plurality of possible routes, road construction information along the determined plurality of possible routes, road quality and terrain information along the determined plurality of possible routes.

26. The method of claim 1, wherein the plurality of communicatively connected vehicles comprise electric vehicles.

27. The method of claim 1, wherein the plurality of communicatively connected vehicles wirelessly transmit the vehicle data in real-time via vehicle-to-everything (V2X) communications.

28. The method of claim 27, further comprising: receiving, by the vehicle, the vehicle data in real-time from infrastructure elements via V2X communications.

* * * * *